Figure 1:
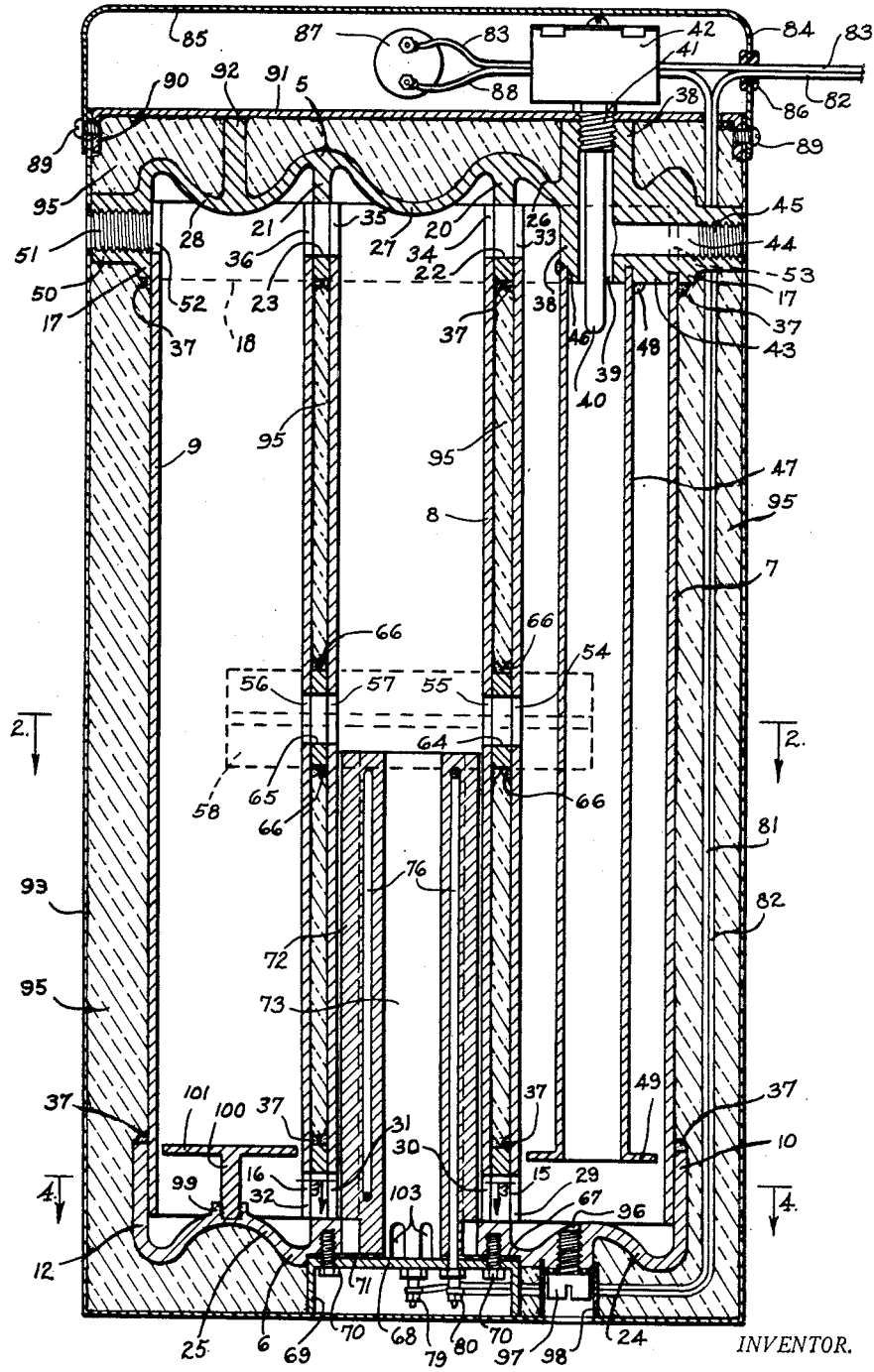

June 21, 1955 L. G. BOWEN 2,711,472
HIGH PRESSURE LIQUID HEATER
Filed Sept. 18, 1951 2 Sheets-Sheet 2

INVENTOR.
LESLIE G. BOWEN
BY
Alfred R. Fuchs
ATTORNEY

United States Patent Office 2,711,472
Patented June 21, 1955

2,711,472

HIGH PRESSURE LIQUID HEATER

Leslie G. Bowen, Evanston, Ill.

Application September 18, 1951, Serial No. 247,083

17 Claims. (Cl. 219—39)

My invention relates to liquid heaters, and more particularly to high pressure electric liquid heaters.

It is the principal purpose of my invention to provide a heater for heating liquid to a high temperature rapidly, which can be placed in a restricted space, particularly where the space is restricted in a horizontal direction, and which is adapted to store a relatively large quantity of heated liquid for the space occupied by the heater.

It is an important purpose of my invention to provide a heater that is adapted to raise the temperature of cold water rapidly to a temperature that it is high enough for sterilization of vessels, such as used in dairies, for example.

Fairly large quantities of water at a temperature slightly below the boiling point are required for this purpose, and my liquid heater is constructed to accomplish such heating and to provide sufficient quantities of water at such a temperature as may be required for sterilizing containers and vessels and for similar purposes in dairies and other similar industries.

As the water is ordinarily supplied to a heater of this character at a high pressure, it is a particular purpose of my invention to provide a liquid heater of the above mentioned character that is capable of withstanding pressures many times that of the ordinary city water pressure.

Another purpose of my invention is to provide a liquid heater capable of use for heating oil or similar liquid for circulation through suitable radiators for space heating purposes.

In order to accomplish the above referred to purposes, I provide a heater that has an inlet compartment, an outlet compartment and a heating compartment, each of said compartments being made up of a tubular member that is capable of withstanding high pressures, and said tubular members being closed at the ends and connected together to connect the compartments by means of header members to which said tubular members are fixed in liquid-tight relation, as by welding. The structure of the header members and the connections of the tubular members therewith are of such a character as to give maximum strength to the liquid containing portion of the heater.

More specifically my invention comprises a liquid heater that has a plurality of such tubular members providing the above referred to compartments, that are not only connected together by means of the header members at their lower and upper ends, but are also connected together between the ends thereof, preferably, substantially midway between the top and bottom ends thereof.

It is a further purpose of my invention to provide a heating unit in the heating compartment that is located only in that portion of the tubular heating compartment below the connection between the mid-portion thereof and said inlet and outlet compartments, thus providing a large hot water storage space in said tubular members above said heating unit, the liquid circulating between the heating portion of the heating compartment and the upper portions of the inlet, outlet and heating compartments to rapidly heat the contents of the compartments to a very high temperature. At the same time a rapid circulation of liquid occurs between the heating portion of the heating compartment and the inlet and outlet compartments, through the passages between the lower ends of said inlet and outlet compartments and the heating compartment, to heat all of the contents of the inlet, outlet and heating compartments to a uniform high temperature.

It is a further purpose of my invention to provide a new and improved heating unit, which has a heating element that is embedded in a body of metal that is a very good heat conductor, the heating element being so mounted that the resistance element thereof is electrically insulated from the metal of the heating unit and said heating unit being so constructed and arranged that it provides a plurality of passages for liquid in engagement with the heated walls thereof, being preferably made of a tubular character and having fins thereon that extend from the tubular body portion thereof into adjacency to the walls of the tubular heating compartment in which said heating element is located.

It is still a further purpose of my invention to provide temperature responsive means for controlling the operation of said heater, which is mounted in the inlet connection in such a manner that any cold or cool liquid entering through the inlet connection will immediately come in contact therewith so that as soon as any of the water or other liquid heated to a high temperature is withdrawn through the outlet connection the heating element will immediately begin to operate, the temperature responsive means being so mounted as to be shielded from the flow of heated liquid in the inlet compartment during the circulation thereof, until all of the liquid in the inlet compartment has been heated sufficiently to heat the liquid within the shielding means and the inlet connection to a temperature sufficient to actuate the temperature responsive means, thus assuring that the temperature responsive means will not be operated to halt the heating action of the heating unit until all of the contents of the heater have reached the desired temperature.

It is a further purpose of my invention to provide an inlet connection entering the upper portion of the heater with a tubular extension or baffle thereon that extends to near the bottom of the inlet compartment so as to deliver the cool liquid entering the heater near the bottom of said inlet compartment and to provide baffle means both in said inlet and outlet compartments just above the connection between said compartments and the heating compartment so as to prevent the upward flow of the heated liquid at too rapid a rate toward the upper portions of the inlet and outlet compartments, thus directing the liquid to be heated into the heating compartment and into the passages that are provided between the walls of the heating unit and the tubular wall of the heating compartment and through the heating unit.

It is a further purpose of my invention to provide a simple and strong means for connecting the tubular compartments between the ends thereof, which means serves to reinforce the tubular members and provide a strong welded joint between said tubular members and the connecting means and at the same time provide a simple and effective means for communication between the compartments between the ends thereof.

Other objects and advantages of my invention will appear as the description of the drawings proceeds. I desire to have it understood, however, that I do not intend to limit myself to the particular details shown or described, except as defined in the claims.

In the drawings:

Fig. 1 is a vertical sectional view through my improved heater.

Figure 4:
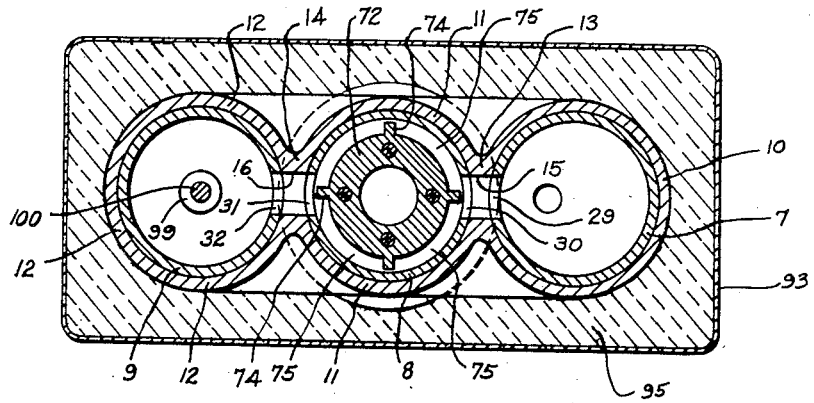
Figure 3:
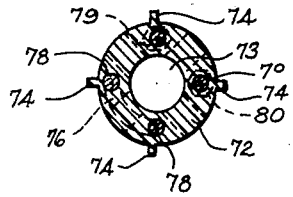
Figure 2:
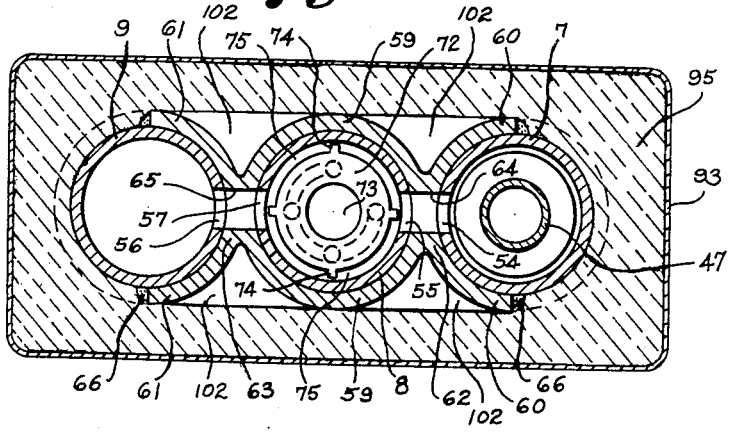

Fig. 2 is a section taken on the line 2—2 of Fig. 1.
Fig. 3 is a section taken on the line 3—3 of Fig. 1, and
Fig. 4 is a section taken on the line 4—4 of Fig. 1.

Referring in detail to the drawings, my improved liquid heater is provided with an upper header member 5 and a lower header member 6, between which extend the tubular members 7, 8 and 9. The header members have flanges thereon for receiving the tubular members so that the same can be welded in liquidtight relation to said header members and thus provide a strong structure capable of withstanding high pressures. The flanges are of an arcuate character to closely receive the tubular members, said arcuate flanges on the lower header members 6 being indicated by the numerals 10, 11 and 12, and it will be noted that the flanges 10 and 11 and the flanges 11 and 12 are connected together by means of web portions 13 and 14, through which passages 15 and 16 extend.

The header member 5 is similarly constructed, having flanges 17, 18 and 19 for receiving the tubular members 7, 8 and 9, and having web portions 20 and 21 that are provided with openings 22 and 23 corresponding to the openings 15 and 16. Said header members are provided with inwardly dished wall portions 24, 25, 26, 27 and 28 to strengthen the same.

The tubular members 7, 8 and 9 are provided with openings in their lower and upper edge portions aligning with openings 15, 16, 22 and 23, the openings in the tubular members 7 and 8 aligning with the opening 15 being indicated by the numerals 29 and 30, and the openings in the tubular members 8 and 9 aligning with the opening 16 being indicated by the numerals 31 and 32, while the openings in the tubular members 7 and 8 aligning with the opening 22 are indicated by the numerals 33 and 34, and the openings in the tubular members 8 and 9 aligning with the opening 23 are indicated by the numerals 35 and 36. It will thus be seen that communication is established between the lower ends of the chambers within the tubular members 7 and 8 through the aligning openings 29, 15 and 30 and between the upper end portions of said chambers through the openings 33, 22 and 34, while communication is established between the lower ends of the chambers within the tubular members 8 and 9 through the aligning openings 31, 16 and 32 and between the upper ends of said chambers through the aligning openings 35, 33 and 36. The tubular members are welded in position on the header members by means of continuous welds, indicated by the numeral 37, to thus provide a liquidtight connection between the header members and the tubular members.

The upper header member 5 also is provided with a central tubular extension 38, which extends both upwardly and downwardly from the dished wall 21, having a passage 39 therein, in which the thermostatic element 40 is mounted, said thermostatic element being provided with a screw-threaded mounting means 41, which is screw-threadedly mounted in the member 38, and the switching means operated by said thermostatic element 40 being indicated generally by the numeral 42. The header member 5 is further provided with a thickened portion 43, that has a passage 44 therethrough leading into the passage 39 from one side thereof, and has an internally screw-threaded portion 45 to which an inlet pipe can be connected. Thus the passage 44 and the passage 39 constitute an inlet connection for the liquid to be heated for entrance into the heater. The member 38 is provided with an annular shoulder 46, on which the upper end of a tubular baffle member 47 is mounted and welded thereto, as indicated at 48. Said tubular baffle member is provided with a laterally extending annular flange 49 at its lower end, located immediately above the opening 29. The thermostatic element 40 extends slightly into the tubular member 47.

It will be seen that by providing the tubular member 47 a baffle or shield is provided whereby the incoming cold or cool liquid will come in direct contact with the thermostatic or heat responsive element 40 that operates the switching device 42, not mingling with any of the warm or hot water in the chamber 47 until it reaches the lower open end of the tubular member 47 and that upon reaching said lower open end of said tubular member the incoming liquid will not tend to flow up immediately on the outer side of the tubular member 47, but will be restrained from flowing freely upwardly by means of the baffle flange 49, thus causing the incoming liquid to be directed principally into the aligning openings 29, 15 and 30 into the heating chamber within the tubular member 8. Thus the tubular member 7 serves as an inlet chamber and the tubular member 8 serves as a heating chamber, while the tubular member 9 serves as an outlet chamber, the outlet connection 50 being provided on the header member 5 having a passage 51, and being screw-threaded for receiving a suitable outlet pipe, and which aligns with a notch or opening 52 in the tubular member 9 at the upper end thereof. The tubular member 7 is, of course, also notched as indicated at 53 to receive the enlargement 43 on the header member 5.

The chambers within the tubular members 7, 8 and 9 are also connected together mid-way between the upper and lower ends thereon in the manner to be described below. The tubular member 7 has an opening 54 therein and the tubular member 8 has an opening 55 therein aligning with the opening 54. The tubular member 9 has an opening 56 therein and the tubular member 8 has an opening 57 aligning with the opening 56. A connecting member 58 is provided, that has a pair of arcuate wall portions 59 that substantially embrace the tubular member 8, as shown in Fig. 2, and has a pair of arcuate flanges 60 and 61 that are connected with the arcuate portions 59 by means of connecting web portions 62 and 63. The web portions 62 and 63 have openings 64 and 65 therein, respectively, that align with the openings 54 and 55 and with the openings 56 and 57, respectively. The arcuate flanges 60 and 61 partially embrace the tubular members 7 and 9, as will be obvious from Fig. 2, and all the marginal edge portions of the member 58 are welded to the tubular members 7, 8 and 9, as indicated at 66, to thus provide a liquidtight strong connection between the connecting member 58 and the tubular members 7, 8 and 9 and providing for communication between the chambers in the tubular members 7 and 8, and in the tubular members 8 and 9 midway between the top and bottom thereof.

The header member 6 is provided with a shoulder 67, which has a plate 68 having an annular flange 69 thereon clamped thereto by means of screw-threaded headed members 70, a suitable compressible gasket 71 being provided between said shoulder 67 and said plate 68 to provide a liquidtight connection between the plate 68 and the header member. Mounted on the plate 68 is a heating unit 72, which has a tubular wall portion providing a central passage 73 therein, and which is provided with a plurality of longitudinally extending fins 74 thereon, which extend to closely adjacent the wall of the tubular member 8 to provide a plurality of passages 75 between the tubular member 8 and the tubular body portion of the heating unit 72. Notches or cut away portions 103 are provided in the lower end portion of the tubular body portion of the member 72 to provide access of liquid to the interior of said heating unit into the passage 73. Cast in the heating unit 72 is a heating element 76, which is made up of a resistance element 77 and an insulating housing 78 for said resistance element, which is capable of being cast in the metallic body portion of the heating unit 72. In the drawings the heating unit is shown as having said heating element extending longitudinally in the heating unit, with lengths thereof running substantially in alignment with the fins 74, but any desired arrangement of heating element or elements in the heat conducting body portion 72 that may be desired can be provided. The heating element is shown as being provided with terminals 79 and 80, to which the conductors 81 and 82 are connected.

The conductor 82 and a conductor 83 extend through the depending flange 84 of the cover member 85 through a suitable insulating bushing 86 and said conductor 83 extends to one terminal of a mounting 87 for a pilot light, from which the conductor 88 extends to the thermostatic switching means 42, the conductor 81 extending from said thermostatic swiching means 42 to the heating element. Thus the thermostatic switching element, the pilot light and the heating element are connected in series.

The flanged cover member 85 may be secured in position in any desired manner, as by means of screws 89 extending through marginal slots in the flange 84, and connected with a depending flange 90 on an inner top plate 91, which is mouted on the member 38 and on a fin 92 provided on the header member 5. An outer housing 93 is provided, that extends from the flange 90 to the bottom of the heater and has a bottom wall 94 spaced from the header 6, the flange 69 on the plate 68 engaging the bottom 94 of the housing to space it from said header member. Suitable heat insulating material 95 is provided between the housing and the tubular members 7, 8 and 9 and between the plate 91 and the header member 5.

The header member 6 is provided with a drain opening 96 that is screw-threaded to receive a screw-threaded plug 97, a tubular member 98 being provided to provide a drain passage from the header member through the bottom 94 of the outer housing 93. The header member 6 is also provided with an internally screw-threaded opening in a boss 99 on the inner side thereof, in which the depending stem portion 100 of a baffle plate 101 is received to mount said baffle plate in position immediately above the passage provided by means of the openings 31, 16 and 32. In order to provide additional strength for the connecting member 58, strengthening ribs 102 may be provided between the arcuate portions 59, 60 and 61.

In operation, the water or other liquid in the heater will circulate between the chambers within the tubular members 7 and 9 and the chamber within the tubular member 8, which constitutes a heating chamber. The main circulation will be through the openings 29, 15 and 30, 31, 16 and 32 at the bottom, and the openings 54, 64 and 55, and 57, 65 and 56 at the mid-portion of the chambers, but there will also be circulation of liquid between the openings in the upper ends of the chambers and the openings in the mid-portions thereof. This circulation will continue until the water or other liquid in the chambers 7, 8 and 9 has reached such a temperature that the water in the passage within the tubular member 47 and in the passage 39 will have reached a temperature to cause the thermostatic means 40 to operate the thermostatically controlled switch 42 to open the circuit and halt the heating operation.

As soon as any liquid is withdrawn through the outlet passage 51, cool or cold liquid will enter through the inlet passage 44 and come in immediate contact with the thermostatic element 40, whereupon the switching means 42 will immediately close to cause the heating element to immediately begin to heat the liquid that is passing from the lower end of the tubular member 47 into the heating chamber. This will continue until the temperature is again reached for all the liquid in the heater such that the thermostatic element 40 will be operated to open the switching means 42 in the manner above pointed out.

What I claim is:

1. In a liquid heater, a plurality of tubular members arranged in side by side relation providing an inlet compartment, an outlet compartment and a heating compartment between said inlet and outlet compartments, a heating unit in said heating compartment extending lengthwise thereof near the tubular wall of said compartment to provide a restricted passage between said unit and wall, said unit having fins thereon extending lengthwise thereof into adjacency to the tubular wall of said heating compartment, and means connecting said inlet and outlet compartments with said heating compartment adjacent both ends thereof.

2. In a liquid heater, a plurality of vertically extending, adjacent, parallel tubular members providing an inlet compartment, an outlet compartment and a heating compartment between said inlet and outlet compartments, a heating unit in said heating compartment extending lengthwise thereof and having fins thereon extending lengthwise of said unit into adjacency to the tubular wall of said heating compartment, and means connecting said inlet and outlet compartments with said heating compartment adjacent the upper and lower ends thereof and between the ends thereof.

3. In a liquid heater, a plurality of members connected together and providing a tubular inlet compartment, a tubular outlet compartment and a tubular heating compartment between said inlet and outlet compartments, said compartments being in adjacency and in parallelism, a tubular heating unit in said heating compartment extending lengthwise thereof having a longitudinal liquid passage therethrough and having fins thereon extending lengthwise of said unit into adjacency to the tubular wall of said heating compartment, and means connecting both said inlet and outlet compartments with said heating compartment adjacent both ends thereof.

4. In a liquid heater, upper and lower header members, compartment forming members secured in liquidtight relation to said header members, said members being formed to provide tubular inlet, tubular heating and tubular outlet compartments between said header members, said heating compartment being mounted between said inlet and outlet compartments and being connected therewith at both upper and lower ends of said inlet and outlet compartments by means of said header members, and a heating unit in said heating compartment extending longitudinally thereof, said heating unit having a cross sectional shape providing a plurality of liquid passages in said heating compartment externally of said heating unit.

5. In a liquid heater, upper and lower header members, compartment forming members secured in liquidtight relation to said header members, said members being formed to provide tubular inlet, tubular heating and tubular outlet compartments between said header members, said heating compartment being mounted between said inlet and outlet compartments and being connected therewith at both upper and lower ends of said inlet and outlet compartments by means of said header members, means connecting said heating compartment and said inlet and outlet compartments between the ends thereof, and a heating unit in said heating compartment extending between said last mentioned means and said lower header member.

6. In a liquid heater, an upright tubular member providing an inlet compartment, an inlet connection at the upper end of said inlet compartment, a temperature responsive element in said inlet connection, and a tubular member coaxially arranged relative to said inlet compartment having a liquid tight connection with said inlet connection and extending therefrom lengthwise of said compartment to near the bottom of said compartment in spaced relation to the wall thereof to provide an annular liquid passage in said compartment surrounding said inlet passage.

7. In a liquid heater, an upright tubular member providing an inlet compartment, an inlet connection at the upper end of said inlet compartment, a temperature responsive element in said inlet connection, a tubular member having a liquid tight connection with said inlet connection and extending therefrom lengthwise of said compartment to near the bottom of said compartment in spaced relation to the wall thereof to provide an annular liquid passage in said compartment surrounding said inlet passage, and a baffle extending from the lower end of said last mentioned tubular member toward the tubular wall of said compartment.

8. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, an outlet connection at the upper end of said outlet compartment, and a baffle member in said outlet compartment immediately above the connection between the lower end thereof and said heating compartment.

9. In a liquid heater, upper and lower header members, compartment forming members secured in liquidtight relation to said header members, said members being formed to provide tubular inlet, tubular heating and tubular outlet compartments between said header members, said heating compartment being mounted between said inlet and outlet compartments and being connected therewith at both upper and lower ends of said inlet and outlet compartments by means of said header members, means connecting said heating compartment and said inlet and outlet compartments between the ends thereof, comprising a member embracing the heating compartment between its ends and being welded thereto and having opposite end portions partially embracing the inlet and outlet compartments and welded thereto, and a heating unit in said heating compartment.

10. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, means for introducing liquid into the lower end of said inlet compartment, an outlet connection at the upper end of said outlet compartment, and baffles in said inlet and outlet compartments immediately above the connection between the lower ends thereof and said heating compartment.

11. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, means for introducing liquid into the lower end of said inlet compartment, an outlet connection at the upper end of said outlet compartment, means connecting said inlet and outlet compartments with said heating compartment between the ends thereof, and baffles in said inlet and outlet compartments immediately above the connection between the lower ends thereof and said heating compartment.

12. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, means for introducing liquid into the lower end of said inlet compartment, an outlet connection at the upper end of said outlet compartment, means connecting said inlet and outlet compartments with said heating compartment between the ends thereof, said heating unit extending only between the lower end of said heating compartment and said last mentioned means, and baffles in said inlet and outlet compartments immediately above the connection between the lower ends thereof and said heating compartment.

13. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, an inlet connection at the upper end of said inlet compartment, a tubular baffle member extending from said inlet connection to adjacent the lower end of said inlet compartment above its connection with said heating compartment at said lower end, an outlet connection at the upper end of said outlet compartment, and baffles in said inlet and outlet compartments immediately above the connection between the lower ends thereof and said heating compartment.

14. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, an inlet connection at the upper end of said inlet compartment, a tubular baffle member extending from said inlet connection to adjacent the lower end of said inlet compartment above its connection with said heating compartment at said lower end, an outlet connection at the upper end of said outlet compartment, means connecting said inlet and outlet compartments with said heating compartment between the ends thereof, and baffles in said inlet and outlet compartments immediately above the connection between the lower ends thereof and said heating compartment.

15. In a liquid heater, a plurality of upright tubular members providing an inlet compartment, an outlet compartment and a heating compartment between said inlet and outlet compartments, a heating unit in said heating compartment extending lengthwise thereof, means connecting said inlet and outlet compartments with said heating compartment adjacent the ends thereof, an inlet connection at the upper end of said inlet compartment, a tubular baffle member extending from said inlet connection to adjacent the lower end of said inlet compartment above its connection with said heating compartments at said lower end, an outlet connection at the upper end of said outlet compartment, and baffles in said inlet and outlet compartments immediately above the connection between the lower ends thereof and said heating compartment, said heating unit extending only between the lower end of said heating compartment and said last mentioned means.

16. In a liquid heater, a plurality of upright tubular members providing an inlet compartment, an outlet compartment and a heating compartment between said inlet and outlet compartments, a tubular heating unit in said heating compartment extending lengthwise thereof and having fins thereon extending lengthwise of said unit into adjacency to the tubular wall of said heating compartment, means connecting said inlet and outlet compartments with said heating compartment adjacent the ends thereof, means for introducing liquid into the lower end of said inlet compartment, an outlet connection at the upper end of said outlet compartment, means connecting said inlet and outlet compartments with said heating compartment between the ends thereof, and baffles in said inlet and outlet compartments immediately above the connection between the lower ends thereof and said heating compartment, said heating unit extending only between the lower end of said heating compartment and said last mentioned means.

17. In a liquid heater, an upstanding tubular member forming a liquid inlet compartment, said tubular member having an inlet connection at the upper end thereof, an upstanding tubular member forming an outlet compartment having an outlet connection leading from the same at the upper end thereof, liquid heating means between said tubular members connected therewith adjacent the upper and lower ends thereof, said liquid heating means comprising an upstanding tubular member, electric heating means in said last mentioned tubular member, and a header at the upper and lower ends of said upstanding tubular members connected therewith.

References Cited in the file of this patent

UNITED STATES PATENTS

| | | |
|---|---|---|
| 937,776 | Dunham | Oct. 26, 1909 |
| 1,069,372 | Bell | Aug. 5, 1913 |
| 1,188,556 | Patterson | June 27, 1916 |
| 1,298,301 | David | Mar. 25, 1919 |
| 1,318,237 | Sordi | Oct. 7, 1919 |
| 1,640,049 | Nesmith | Aug. 23, 1927 |
| 1,844,268 | Alex | Feb. 9, 1932 |
| 1,876,053 | Hyde | Sept. 6, 1932 |
| 2,407,562 | Lofgren | Sept. 10, 1946 |
| 2,457,596 | Osterheld | Dec. 28, 1948 |
| 2,580,659 | Corbett | Jan. 1, 1952 |